(12) United States Patent
Shaikh et al.

(10) Patent No.: US 7,411,415 B2
(45) Date of Patent: Aug. 12, 2008

(54) BUS TERMINATION SCHEME HAVING CONCURRENTLY POWERED-ON TRANSISTORS

(76) Inventors: Ashfaq Shaikh, 2831 Riedel Rd., San Jose, CA (US) 95135; Ting Ku, 3131 Glen Alto Ct., San Jose, CA (US) 95148; Huabo Chen, 421 Northlake Dr. Apt. 7, San Jose, CA (US) 95117

( * ) Notice: Subject to any disclaimer, the term of this patent is extended or adjusted under 35 U.S.C. 154(b) by 231 days.

(21) Appl. No.: 10/787,923

(22) Filed: Feb. 25, 2004

(65) Prior Publication Data

US 2005/0218927 A1    Oct. 6, 2005

(51) Int. Cl.
*H03K 17/16* (2006.01)
(52) U.S. Cl. .............. 326/30; 326/82; 326/83; 326/86
(58) Field of Classification Search ........... 326/30, 326/86, 27, 39, 83, 82; 710/100, 300; 713/324; 327/321, 94; 333/22 R; 345/501, 530
See application file for complete search history.

(56) References Cited

U.S. PATENT DOCUMENTS

| | | | | |
|---|---|---|---|---|
| 4,992,676 A * | 2/1991 | Gerosa et al. | ................. | 326/27 |
| 5,248,906 A * | 9/1993 | Mahmood | ................. | 326/27 |
| 5,442,305 A * | 8/1995 | Martin et al. | ................. | 326/30 |
| 5,602,494 A * | 2/1997 | Sundstrom | ................. | 326/39 |
| 5,608,312 A * | 3/1997 | Wallace | ................. | 323/224 |
| 5,619,147 A * | 4/1997 | Hunley | ................. | 326/26 |
| 5,635,852 A * | 6/1997 | Wallace | ................. | 326/30 |
| 6,026,456 A * | 2/2000 | Ilkbahar | ................. | 710/100 |
| 6,054,881 A * | 4/2000 | Stoenner | ................. | 327/112 |
| 6,154,060 A | 11/2000 | Morriss | ................. | 326/86 |
| 6,194,924 B1 * | 2/2001 | Welch et al. | ................. | 327/112 |
| 6,204,692 B1 * | 3/2001 | Nakagawa | ................. | 326/83 |
| 6,232,814 B1 * | 5/2001 | Douglas, III | ................. | 327/281 |
| 6,351,358 B1 | 2/2002 | Allen | ................. | 361/90 |
| 6,359,951 B1 | 3/2002 | Morriss et al. | ................. | 375/377 |
| 6,362,655 B1 * | 3/2002 | Abraham et al. | ................. | 326/83 |
| 6,366,129 B1 * | 4/2002 | Douglas et al. | ................. | 326/86 |
| 6,414,512 B1 * | 7/2002 | Moyer | ................. | 326/30 |
| 6,424,170 B1 * | 7/2002 | Raman et al. | ................. | 326/30 |
| 6,426,854 B1 | 7/2002 | Allen | ................. | 361/56 |
| 6,512,401 B2 * | 1/2003 | Clark et al. | ................. | 327/112 |
| 6,515,502 B1 * | 2/2003 | Hsiao et al. | ................. | 326/30 |
| 6,642,742 B1 * | 11/2003 | Loyer | ................. | 326/30 |
| 6,744,275 B2 * | 6/2004 | Chansungsan | ................. | 326/30 |
| 6,781,416 B1 * | 8/2004 | Nguyen et al. | ................. | 326/83 |
| 6,930,507 B2 * | 8/2005 | Dreps et al. | ................. | 326/30 |
| 7,154,981 B2 * | 12/2006 | Tokuhiro et al. | ................. | 326/30 |
| 7,239,171 B1 * | 7/2007 | Wang et al. | ................. | 326/30 |
| 2004/0080339 A1 * | 4/2004 | Kubo | ................. | 326/83 |

OTHER PUBLICATIONS

Dave Bursky, "Shhh! Nonlinear Active Termination Quiets Ringing", Electronic Design, Nov. 20, 2000, 6 Pgs.
Rabaey, et al., "Digital Integrated Circuits a Design Perspective", Coping with interconnect, Dec. 15, 2002, 34 Pgs.

(Continued)

*Primary Examiner*—Linh Nguyen
(74) *Attorney, Agent, or Firm*—Berkeley Law and Technology Group, LLP

(57) ABSTRACT

Embodiments of methods, apparatuses, systems and/or devices associated with a bus termination scheme are disclosed.

35 Claims, 9 Drawing Sheets

OTHER PUBLICATIONS

"How to Optimize Memory Resource Cost and Performance in SoC Designs" www.same-conference.org, 2003, Abstract, 1-5 Pgs, no month.

Alexander, "Signal Integrity in FPGA Design", (V1.0) Aug. 22, 2002, MAPLD Conference 2002, 11 Pgs.

Dr. Paul D. Franzon, NC State University, ECE 733 Class Notes, www.ece.ncsu.edu/erl/faculty/paulf.html, 2003, 13 Pgs, no month.

"Integrated Passive & Active Devices Filter and Termination Circuits", STMicroelectronics 2001, 4 Pgs, no month.

Bashirullah, et al., "Low-Power Design Methodology for an On-Chip Bus With Adaptive Bandwidth Capability", DAC 2003, pp. 628-633, no month.

Lostcircuits, "Sacrificing Latency", Jan. 6, 2003, www.lostcircuits.com/memory/ddrii, 13 Pgs.

David G. Morrison, "Bus-Termination Scheme Offers Space and Layout Advantages", Electronic Design 2001, 3 Pgs, no month.

Lee Sledjeski, "Considerations for Bus Termination in Computing Systems", International IC 1999 Conference Proceedings, pp. 223-228, no month.

Cost Assessment-Discrete Resistors vs. Integrated Resistor Networks, California Micro Devices, www.calmicro.com/applications/appdocs/html/st-101.html, 7 Pgs, no date.

Stephen Diamond, "P1394: Good for Desktops and Portables", Micro Standards, Apr. 1995 IEEE, pp. 81-83, no date.

Singh, et al., "A 1.9V I/O Buffer With Gate-Oxide Protection and Dynamic Bus Termination for 400MHz Ultrasparc Microprocessor", no date, 1999 IEEE International Solid-State Circuits Conference, pp. 274-275, no month.

John Tucker, "Using the TPS54672 Tracking/Termination Synchronous PWM Switcher With Integrated FETs (Swift) for DDR and Bus Termination Applications", no date, Texas Instruments Nov. 2001, 3 Pgs, no date.

* cited by examiner

US 7,411,415 B2

BUS TERMINATION SCHEME HAVING CONCURRENTLY POWERED-ON TRANSISTORS

BACKGROUND

This disclosure is related to bus termination schemes.

Continuing improvements in semiconductor manufacturing technology have resulted in smaller transistors and faster signaling. These improvements, however, have also produced new technical challenges. In particular, as signaling and data rates continue to increase, parasitic effects and other contributions to signaling noise may become more pronounced. To address these undesired effects, when transmitting signals across a bus, for example, termination schemes may be employed to produce sharper and/or faster transitions.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Continuing improvements in semiconductor manufacturing technology have resulted in smaller transistors and faster signaling. These improvements, however, have also produced new technical challenges. In particular, as signaling and data rates continue to increase, parasitic effects and other contributions to signaling noise may become more pronounced. To address these undesired effects, when transmitting signals across a bus, for example, termination schemes may be employed to produce sharper and/or faster transitions.

In high speed digital systems, for example, designers continue to face the challenge of digital switching noise. Undesirable effects which may result from parasitic effects and/or other mismatches in a circuit and/or system may become pronounced and/or affect performance in fast switching digital data streams and/or control systems. In particular, digital ones may appear to be digital zeros and digital zeros may be appear to be digital ones, resulting in erroneous results and/or reduced performance.

Typically, complex board designs with copper ground planes, resistor terminations of signal lines, and/or controlled impedance wiring layouts have been employed to address this issue. However, chip pin counts are increasing and board layouts are becoming even more complex, resulting in more complex solutions that may potentially increase costs. Furthermore, resistive terminations typically consume board area, especially if several hundred pins per chip are terminated. Furthermore, resistive terminations may also consume a significant amount of power, which may increase system power consumption. For portable systems, this may reduce the time the system may operate on batteries, which may prove to be undesirable in at least some situations.

Figure 1:
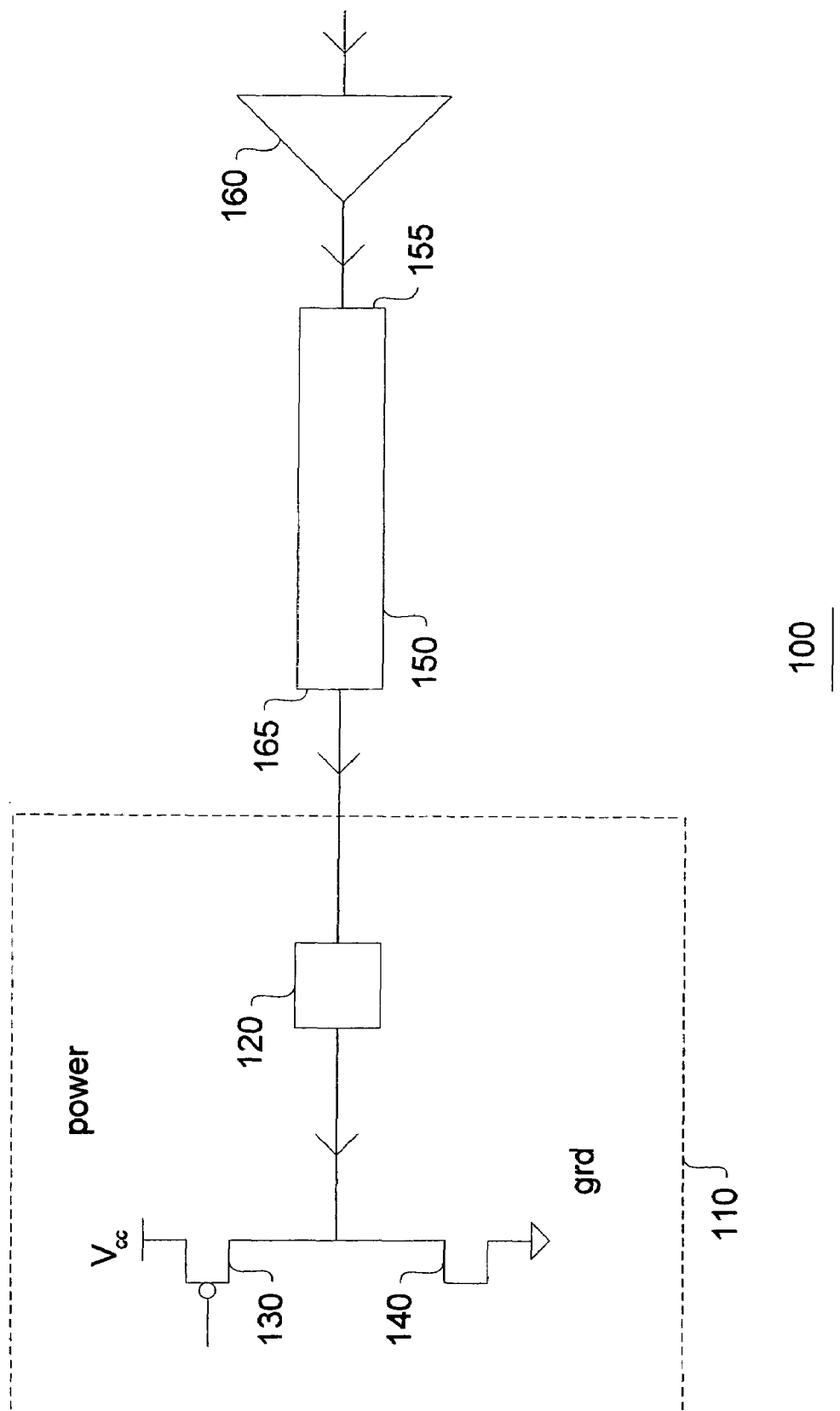
FIG. 1 is a schematic diagram illustrating an embodiment of a bus termination scheme.

Although the claimed subject matter is not limited in scope in this respect, one embodiment of a bus termination scheme employs a configuration such that, during switching, the impedance of the configuration is nonlinear at least in part, as explained in more detail hereinafter. FIG. 1 is a schematic diagram illustrating a conceptual representation of a bus termination scheme for one particular embodiment. As illustrated in FIG. 1, the termination scheme is "on chip," although the claimed subject matter is not necessarily limited in scope in this respect.

FIG. 1 illustrates a transmission line 150, which may comprise a typical bus, such as may be employed to communicate between a processing unit, such as, for example, a graphical processing unit (GPU), and memory, as just one example. Although the claimed subject matter is not limited in scope in this respect, it is noted that such a GPU and memory may be implemented in a variety of systems, including at least one of following systems: a desktop computer, a mobile computer, a game console, a hand-held device, a wireless communications device, a networked device, a display system, a motherboard, and a graphics card. Component 160, therefore, comprises a memory driver to drive signal fmm one end, 155, of transmission line 150 to another end, 165, of transmission line 150. A pad of the chip is illustrated by reference numeral 120. Likewise, FIG. 1 also illustrates a voltage source, Vcc, a pull-up transistor 130, here a positive metal-oxide semiconductor (PMOS) transistor, and a pull-down transistor 140, here a negative MOS (NMOS) transistor. As shall be explained in more detail hereafter, in this embodiment, the push-pull configuration of transistors 130 and 140, during operation, provides nonlinear impedance. It is, of course, appreciated that the claimed subject matter is not limited in scope to the transistor configuration of FIG. 1, such as, for example, employing a PMOS pull-up transistor and an NMOS pull down transistor.

One feature of the particular embodiment is that this termination scheme comprises active components. It is noted that alternatively, termination schemes may be all passive, employing resistive elements adjusted to match the impedance characteristics of the signal transmission line, for example. Such a scheme is typically relatively easy to implement, although often two resistors are employed per pin, and each termination divider may continually draw current during operation, nominally tens of milliamps, potentially reaching as much as 60 milliamps per pin, depending on the voltage and impedance, for example. Thus, such a scheme may consume more power than is desirable. In addition, such an approach may cost around two cents per component as part of the overall cost of a moderate to high volume manufacturing process. This may prove expensive, depending upon the context and the application. Additionally, the resistors are intended to match transmission line characteristics, but such characteristics may not be known until after the system has been designed or constructed, for example.

In contrast, a termination scheme in accordance with the claimed subject matter may reduce or eliminate external resistors and/or bias supply voltages that may be employed in a resistive termination, thus potentially lowering system costs and/or potentially reducing power consumption. It may also be possible to turn off a number of devices in parallel by employing additional circuitry to further lower power consumption, if desired, as explained in more detail hereinafter. Furthermore, the circuitry may occupy a miniscule amount of chip area when embedded in an integrated circuit and, likewise, may be relatively cheap in comparison with the cost of external resistors, for example. Furthermore, as explained in more detail hereinafter, the circuitry may include the capability to self-adjust, as may be desirable to address changing loads, parasitic effects, mismatches and the like.

Referring again to FIG. 1, the termination scheme includes at least one pull-up and at least one pull-down transistor, although, typically, more pull-up and/or more pull-down transistors may be employed. A feature of this particular embodiment is that the pull-up and pull-down transistors are coupled to be powered "on" concurrently during circuit operation. As shall be explained in more detail hereinafter, this provides the capability to influence the switching current.

It should also be noted that, in this particular embodiment, the pull-up and pull-down transistors employed in this particular embodiment may also be employed in the input/output (I/O) driver. This is depicted, for example, in FIG. 2. Thus, these transistors, employed as part of an embodiment of a bus termination scheme, such as previously described, may be employed to drive signals off chip, that is, in the opposite direction than when receiving signals. Here, 610 corresponds with 110, 620 corresponds with 120, 650 corresponds with 150 and 660 corresponds with 160.

Figure 2:
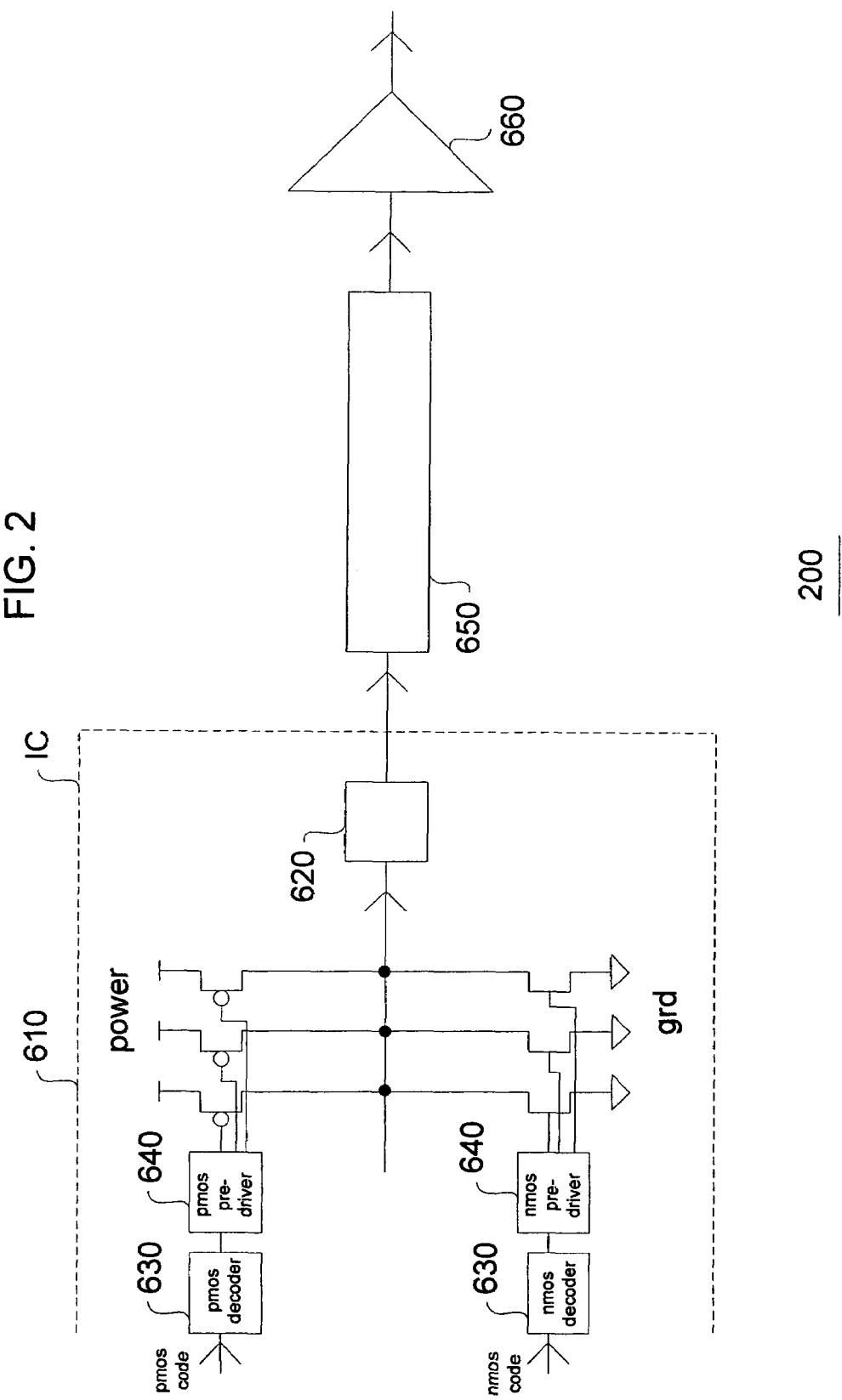
FIG. 2 is a schematic diagram illustrating an embodiment of an input/output (I/O) driver.

In the past, employing transistors of such a driver as part of the termination scheme was not employed for reasons such as the nonlinear behavior that may result and the high current that may be drawn. As shall be discussed in more detail hereinafter, however, these issues are addressed at least by this particular embodiment, although, of course, the claimed subject matter is not so limited. It is noted that FIG. 2 illustrates several pull-up and pull-down transistors coupled in parallel. This shall be discussed in more detail below.

As suggested previously, in this particular embodiment, the pull-up and pull-down transistors are turned "on" concurrently. As shall be explained in more detail, advantages to such an approach include lower intersymbol interference ("ISI"), rail-to-rail received signal voltage switching, less switching noise at power rails, and a more robust solution, meaning, here, circuit performance that is less dependant on transmission line impedance and/or driver impedance mismatches from the transmitting side.

Figure 3:
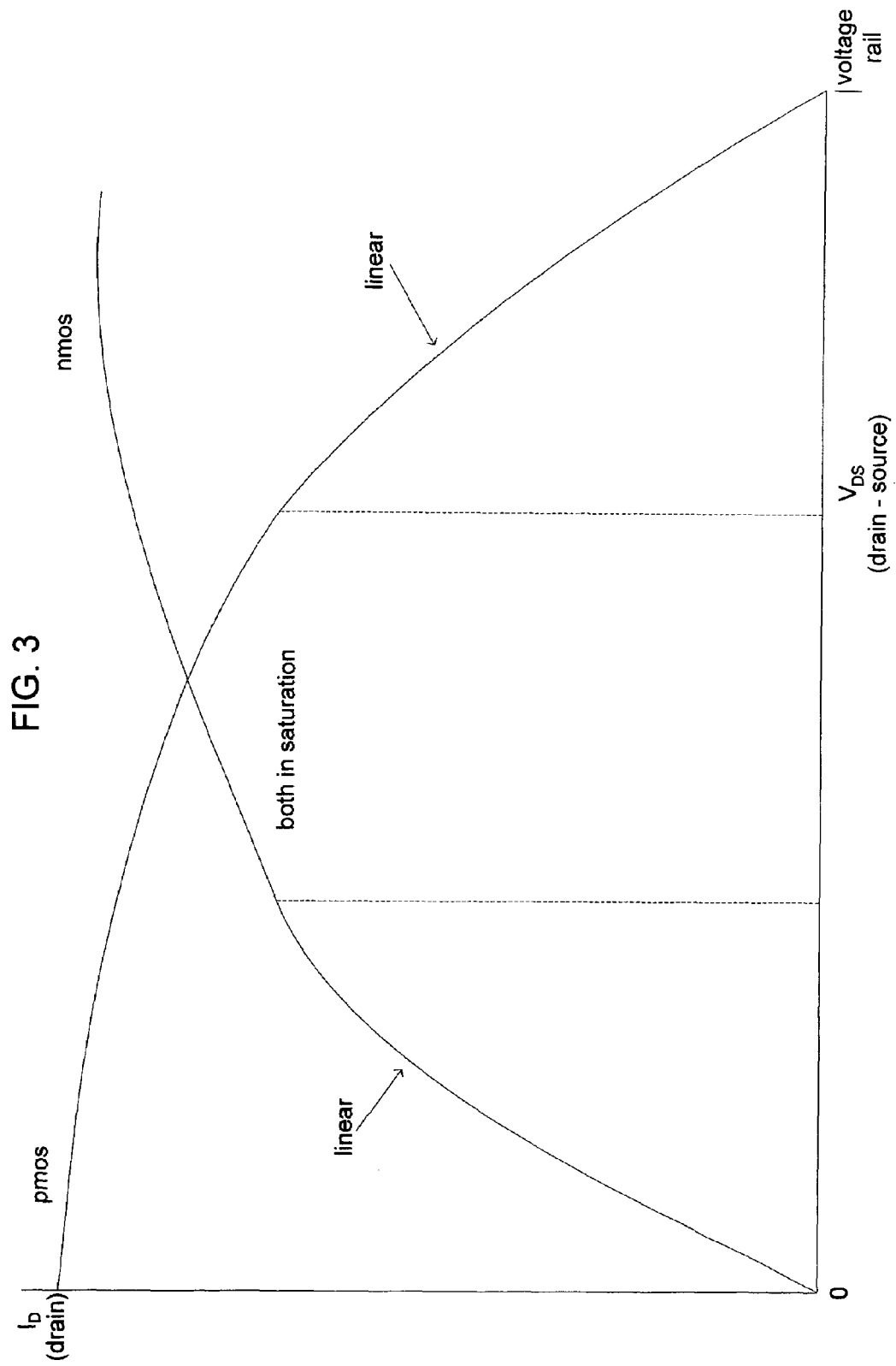
FIG. 3 is a plot illustrating various regions of operation for a transistor, such as a field-effect transistor.

An aspect of circuit operation, as illustrated, for example, in FIG. 3, is that by having both transistors on concurrently, during switching operation, typically one transistor is in saturation, while the other transistor is in the linear region of operation. However, during the middle of the voltage swing, typically, both transistors are in saturation. Likewise, towards the ends of the voltage swing, rather than the middle, one transistor should be in saturation while the other operates in the linear region. Of course, different transistors are in saturation and/or linear operation at the different respective ends of the voltage swing. As shall be explained in more detail hereinafter, this type of transistor switching operation may prove desirable, in this context. For example, FIG. 3 is a plot illustrating the drain current versus drain-to-source voltage for a typical PMOS and NMOS field effect transistors (FETs). Thus, FIG. 3 illustrates current versus voltage for the rail-to-rail voltage swing of this particular embodiment. As is illustrated, at the low voltages, the PMOS transistor operates in its linear region, while the NMOS transistor operates in saturation. In contrast, at the upper voltages of the voltage swing, the NMOS transistor operations in its linear region while the PMOS transistor operates in saturation. Thus, at approximately the middle of the voltage swing, both transistors are operating in saturation, as illustrated in FIG. 3, for example.

Having both transistors in saturation may be desirable in that it results in almost no current being drawn due at least in part to the relatively high resistance associated with having both transistors in saturation. As a result, during the middle of transistor switching, when both transistors are in saturation, almost no current is drawn and, therefore, nearly the entire transmitted signal is reflected. This results in a faster and sharper transition, as is desirable during high speed operation.

As previously explained, during the middle of the voltage swing, both transistors are drawing very little current. It is noted, therefore, that very little switching noise is present, as is desirable. The switching noise may be associated with parasitic inductances and the like, which may depend at least in part on the size of the current and the relative change in the current. Thus, by having a small switching current, switching noise coupled into the received signal is reduced. It is noted that in a switching scheme in which binary one and binary zero are distinguished based at least in part on the midpoint of the voltage swing, reducing the switching noise at this particular point of the voltage swing may be desirable.

As previously noted passive termination schemes, in contrast, typically draw higher current and, therefore, typically consume more power. Likewise, other "on chip" termination schemes typically also draw more power and typically may employ a separate voltage regulator. Thus, such schemes may draw higher current and/or may depend at least in part on good power delivery across the particular chip. Thus, such a scheme may increase pin count and/or may employ more power delivery resources on board and/or in packaging relative to a scheme such as this particular embodiment.

Figure 4:
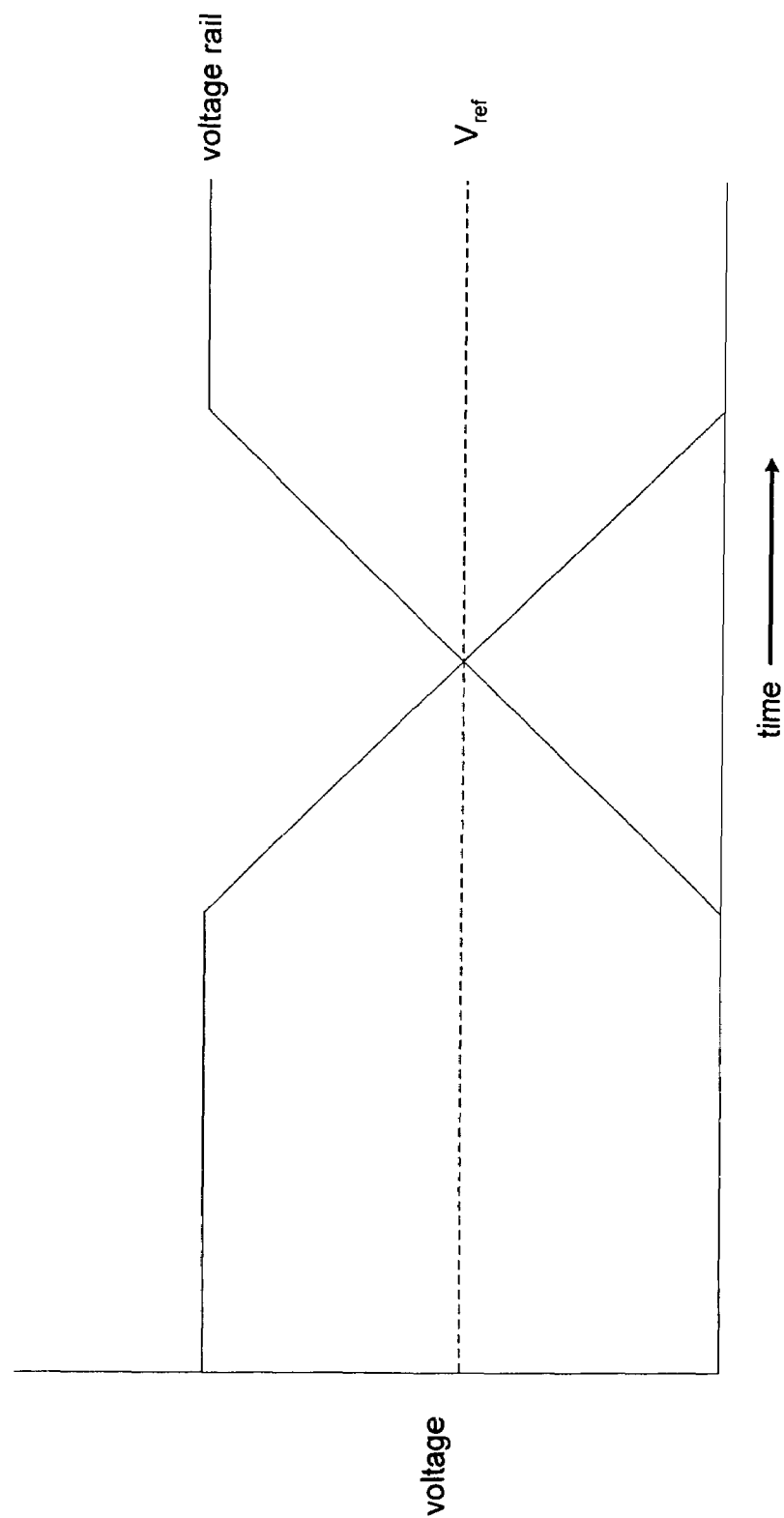
FIG. 4 is a plot illustrating intersymbol interference (ISI)

As previously described, although the claimed subject matter is not limited in scope to this particular embodiment, a termination scheme such as the embodiment illustrated in FIG. 1 may provide improved ISI. FIG. 4, for example, conceptually illustrates "idealized" voltage pulse transitions that would result from transistor circuit operation. As illustrated, although the pulse transitions are relatively fast, nonetheless, such pulse transitions, when an upward transition or downward transition occurs, exhibit some amount of slope due at least in part to the time employed to make the particular voltage transition. However, this figure is "idealized" in the sense that, in the absence of parasitics, mismatches and the like, such transitions would appear as illustrated in FIG. 4, where the transitions cross roughly in the middle of the voltage swing, referred to here as Vref. In contrast, FIG. 5 conceptually illustrates such transitions for non-ideal effects, Thus, due at least in part to a variety of non-ideal circumstances, such as circuit, board and package substrate parasitic effects, mismatches, and the like, typically such transitions may appear as illustrated in FIG. 5.

Figure 5:
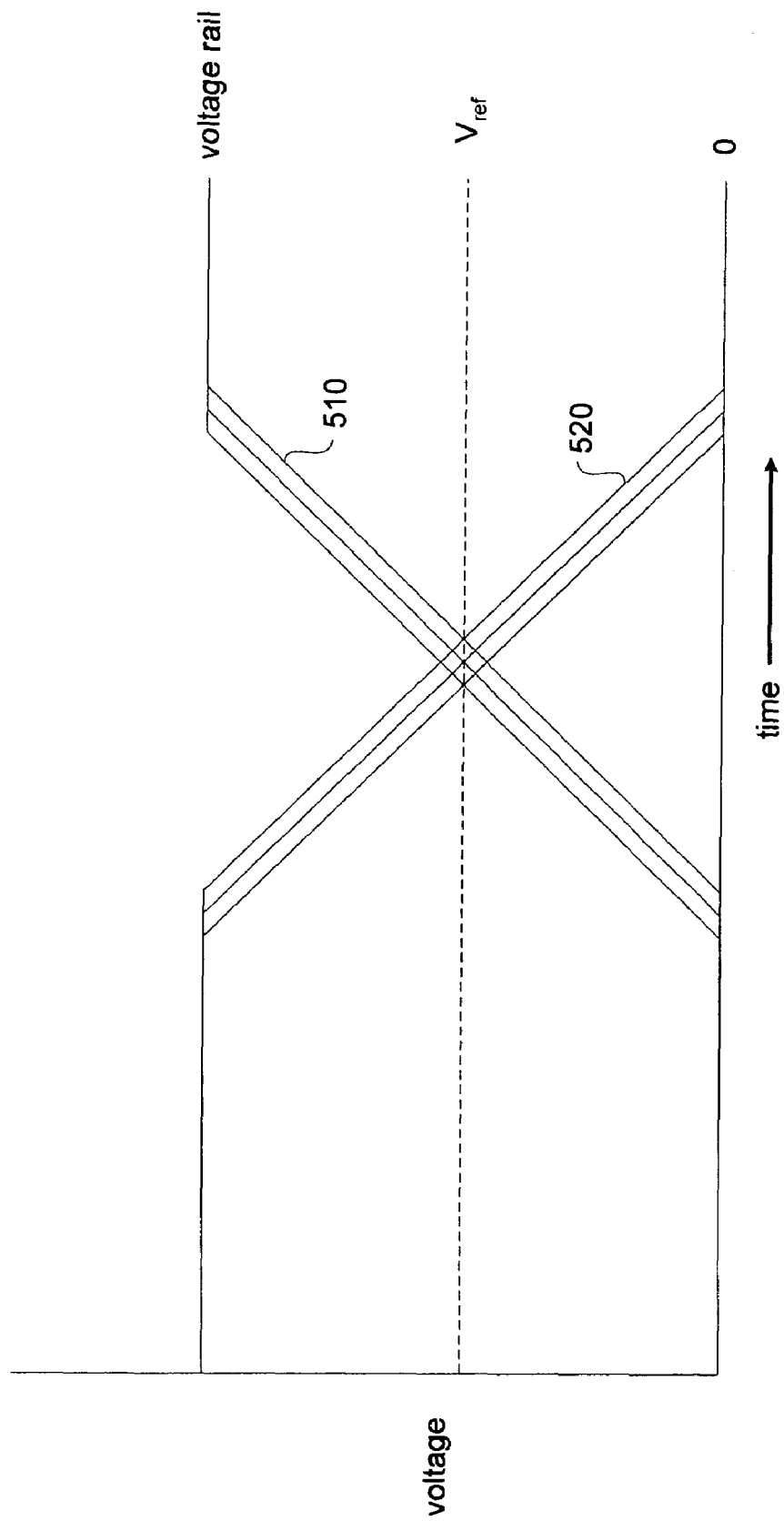
FIG. 5 is another plot illustrating ISI with jitter.

FIG. 5 illustrates what may be referred to in some environments as "jitter." Thus, there is some slight difference in the timing of the upward transition and the downward transition, such as some small amount of time delay or timing variation in the voltage transitions. This variation in the time at which the transition occurs, as illustrated in FIG. 5, may introduce some small amount of delay into chip operation and may, therefore, adversely impact timing performance.

Figure 6:
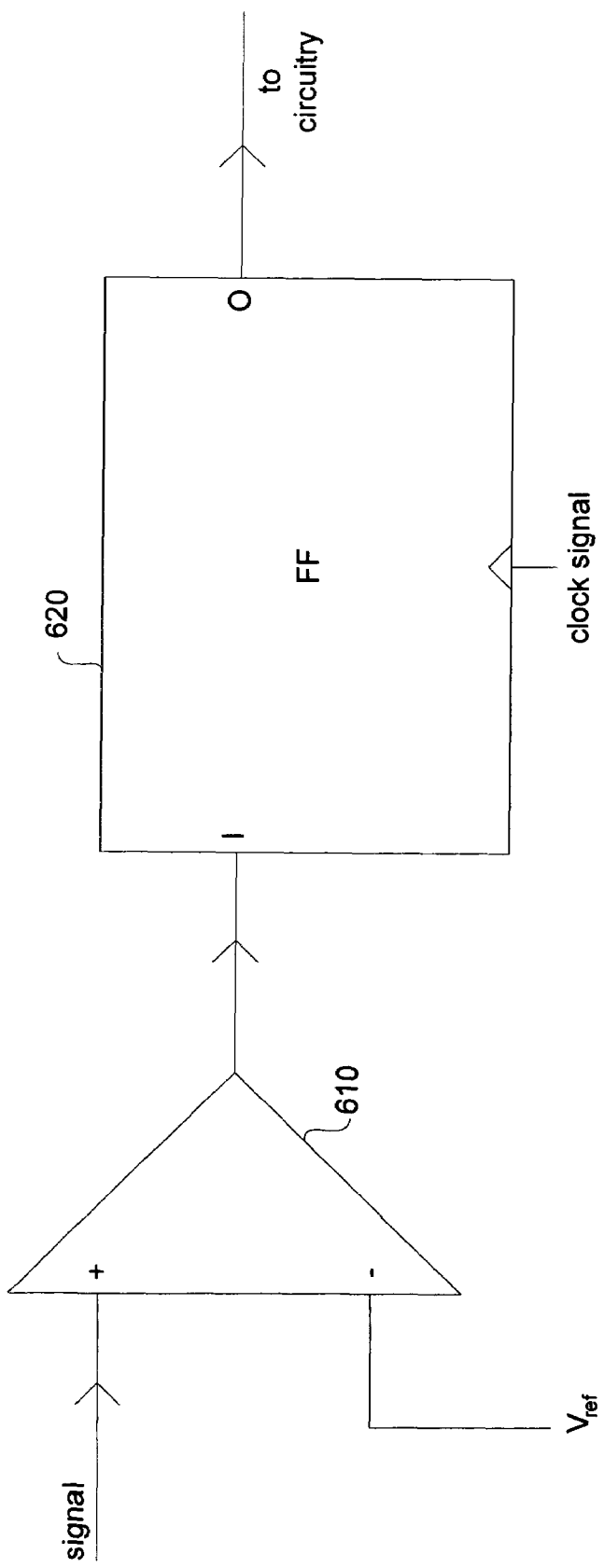
FIG. 6 is a schematic diagram illustrating a circuit configuration in which jitter may produce undesirable circuit delay.

FIG. 6, for example, is a schematic diagram illustrating a differential amplifier, here 610, coupled to a flip-flop, here 620. The claimed subject matter is, of course, not limited to this particular circuitry embodiment. This circuitry simply conceptually illustrates timing delay that may result from the Jitter illustrated in FIG. 5. Thus, differential amplifier 610, for example, receives at its negative input port the voltage reference signal, Vref, which, in this particular embodiment, refers to the midpoint of the voltage swing of the particular circuit. Applied at the positive terminal of the differential amplifier is the pulse signal received at the receiving end of the transmission line. As a result of jitter, either during an upward transition, such as curve 510, illustrated in FIG. 5, or during a downward transition, such as curve 520, illustrated in FIG. 5, the signal applied to flip-flop 620 may experience some small amount of variable time delay when compared to an ideal or idealized transition, such as the transition illustrated in FIG. 4. Thus, some amount of timing allowance is typically provided when the circuitry is designed to address such jitter. If, however, this jitter could be reduced, this would improve circuit performance in terms of speed, as may be desirable, since the amount of timing allowance may be reduced during design of the circuitry, for example.

Continuing improvements in semiconductor manufacturing technology have resulted in smaller transistors and faster signaling. These improvements, however, have also produced new technical challenges. In particular, as signaling and data rates continue to increase, parasitic effects and other contributions to signaling noise may become more pronounced. To address these undesired effects, when transmitting signals across a bus, for example, termination schemes may be employed to produce sharper and/or faster transitions.

Figure 7:
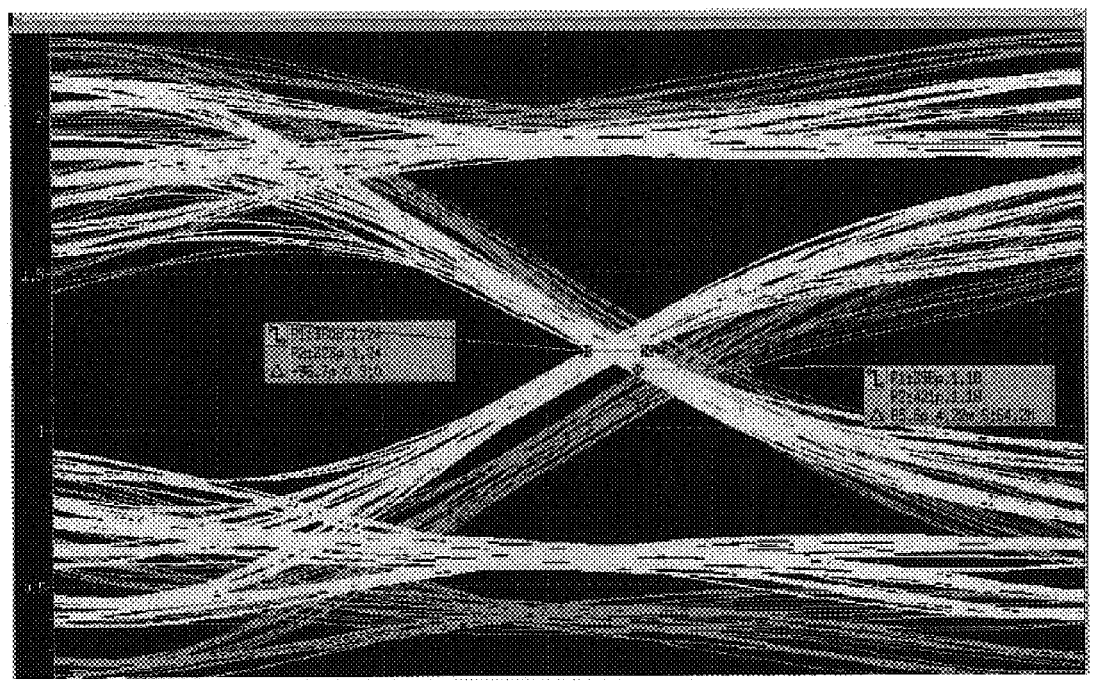
FIGS. 7-9 are plots illustrating various aspects of simulated transistor circuit operation

As previously described, during the middle of the voltage swing, both transistors are in saturation, while, as previously described, at the upper portion of the voltage swing and at the lower portion of the voltage swing, one transistor is in saturation while the other is operating in the linear region. This type of switching operation results in a substantially nonlinear impedance, as previously suggested. FIG. 7, therefore, is a diagram based upon circuit simulation conceptually illustrating the impedance of the push-pull configuration during its voltage swing. As illustrated, the impedance achieves a relatively high value, in the middle of the voltage swing, when both transistors are in saturation. However, when the voltage swing approaches either the lower rail or the upper rail, one of the transistors goes into linear operation and impedance is reduced. When both transistors are in saturation and the impedance is relatively high, as previously suggested, very little current is drawn and, therefore, nearly all of the energy of the pulse transmitted to the receiving end is reflected, resulting in a faster and sharper transition, as previously described. However, when the voltage swing approaches either rail, and one of the transistors enters the linear region of operation, then, current is absorbed by the transistor operating in its linear region. Again, this type of operation may prove to be desirable at least in part because, as the voltage pulse approaches the upper or lower rails, it may be desirable for the voltage level to settle to a value substantially near the rail value. Hence, as previously discussed, nonlinear impedance, as may be produced by this particular configuration, may result in desirable circuit operation.

As previously suggested, another aspect of this particular embodiment is its robust circuit behavior. In particular, this embodiment is relatively less sensitive to the impedance of the termination line and/or the impedance of the transmitter driver. In contrast, for terminations that are substantially linear, to improve circuit performance, such as circuit speed, typically, transmission line impedance and/or transmitter driver impedance is reduced. In this embodiment, performance, such as speed, for example, is less dependant on these impedances. This provides the ability to employ a weaker driver or higher impedance transmitter driver, for example. Furthermore, additional loads or stubs, for example, may be employed with reduced impact on circuit performance.

Another feature of this particular embodiment includes the capability to trade off power consumption with ISI, if desired. More particularly, a larger current permits faster switching to take place, as is desirable. However, it is likewise noted that current flow is related to power consumption. Therefore, while faster switching may improve ISI in terms of less jitter, it also may increase power consumption. Thus, if, in a particular embodiment, it is desirable to save power and a greater amount of ISI may be tolerated, a smaller current may be employed. This may be accomplished through calibration of the transistor impedance to an external impedance, as described in more detail below.

An embodiment of a termination scheme, such as illustrated by the embodiment in FIG. 1, for example, typically includes parasitic capacitance. This parasitic capacitance may typically contributes to ISI. For example, the parasitic capacitance may charge and discharge during circuit operation, interfering with the quality of voltage signal transitions. Higher current, however, permits faster charging and discharging, thereby reducing ISI as a result. Thus, employing a larger current results in less ISI, but, likewise, may also result in greater power consumption. Conversely, a smaller current reduces power consumption, but may result in greater ISI.

It is noted that while the claimed subject matter is not limited in scope in this respect, typically an embodiment in accordance with the claimed subject matter will be implemented with more than one pull-up transistor and/or more than one pull-down transistor, as illustrated, for example, in FIG. 2. More specifically, for this particular embodiment, as previously alluded to, the impedance of the transistors may be calibrated to an external reference resistance. For example, FIG. 2 illustrates several pull-up and pull-down transistors coupled in parallel. However, as also illustrated in FIG. 2, an NMOS pre-driver and PMOS predriver 640 applies voltages to the gates of the respective transistors to turn selected transistors on or off. As illustrated, here, a PMOS and an NMOS decoder 630 receive a PMOS and an NMOS binary code indicating the transistors to turn on or off. The binary codes, in this particular embodiment, are generated off chip, using an external reference impedance with an IC made by the same manufacturing process intended to approximate the characteristics of ICs made by that process. Thus, using the external impedance and a representative IC, the desired impedance is calibrated to the manufacturing process using binary codes indicating the transistors to turn on or off.

Furthermore, although the claimed subject matter is not limited in scope in this respect, an IC may typically include the capability to perform additional self-calibration of the impedance of the pull-up and pull down transistors using binary codes that have been provided to the integrated circuit. As indicated above, this code is externally provided and may be employed by on chip circuitry to calibrate transistor configuration impedance. In addition, typically, this binary code may be adjusted, during circuit operation, for the particular fabrication process employed to manufacture the integrated circuit, as well as the IC operating voltage and the IC operating temperature. Thus, although, again, the claimed subject matter is not limited in scope in this respect, logic may be provided to adjust the impedance of the transistors as these parameters vary. Typically, as illustrated in FIG. 2, this may be accomplished by a decoder 630 which provides a signal to a pre-driver 640 which then drives the gates of the particular pull-up and pull-down transistors.

Figure 8:
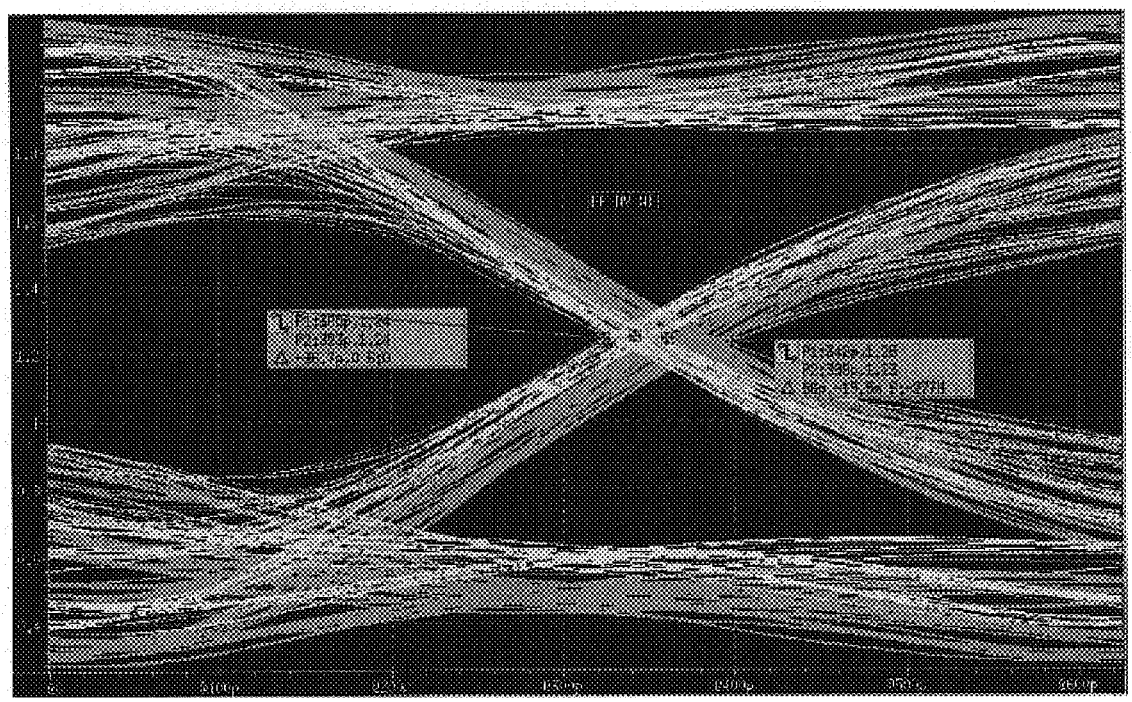
Figure 9:
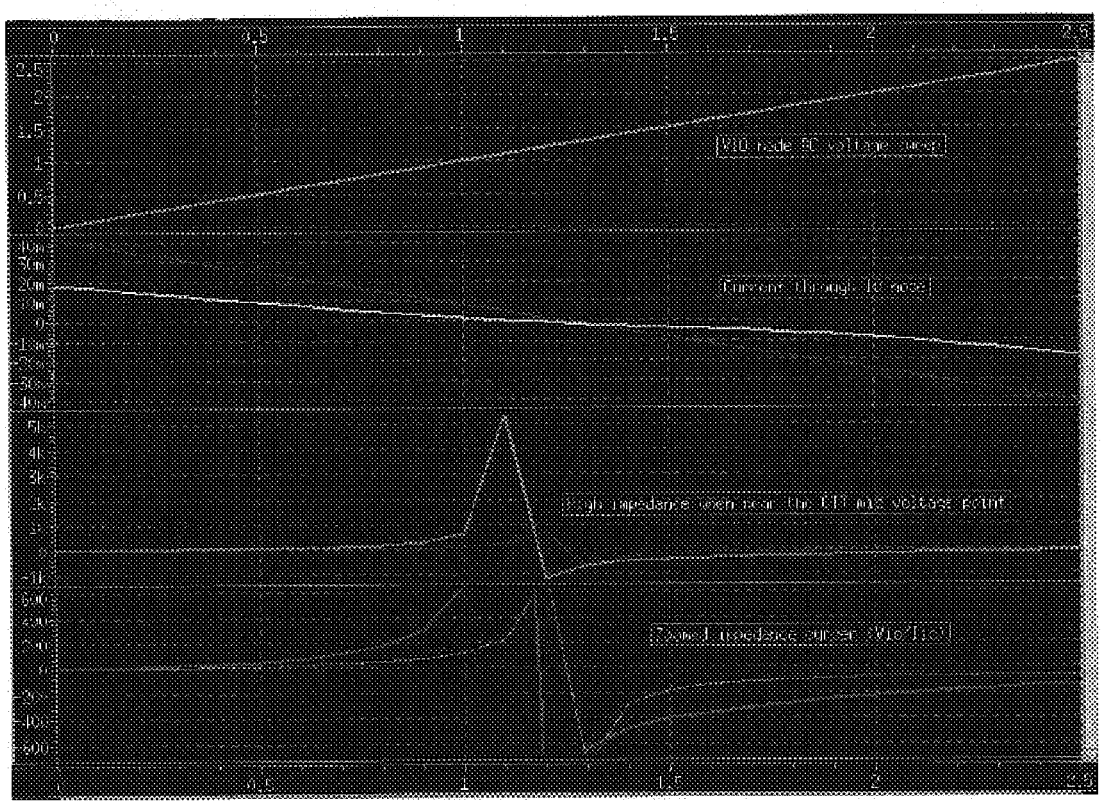

It is noted that to take account of variations in process, voltage, temperature, frequency and the like, simulations have been performed to test the operation of this particular embodiment under a variety of conditions. The results of these simulations are demonstrated in FIGS. 7 through 9. Thus, FIG. 8, for example, illustrates ISI and voltage swing that results from simulation at 800 megahertz using a pull-up transistor having an impedance of 60 ohms and a pull-down transistor having an impedance of 60 ohms, at a nominal temperature and a nominal voltage, where the process employed to manufacture PMOS and NMOS transistors produces a relatively fast transistor. In contrast, FIG. 9 illustrates a similar simulation where the manufacturing process employed produces relatively slow transistors. Although this is merely one example, and the claimed subject matter is not limited in scope in this respect, a typical fast process inverter chain ring oscillator speed is 11 ps/gate and a typical slow process speed is 17 ps/gate. Likewise, FIG. 7 illustrates, through simulation, the impedance of the configuration, as previously described. Again, as previously described, the impedance demonstrates relatively nonlinear behavior. Specifically, in this particular embodiment, the impedance is higher around the mid voltage swing levels.

It is noted that the previously described embodiments have employed pull-up and pull-down transistor configurations that are relatively symmetrical in terms of impedance. For example, in one embodiment, the impedance of the pull-up and pull-down transistors are 60 ohms, although, of course, this is simply one example. It is noted, however, that in some signaling schemes, such as a scheme that has been proposed for double data rate SRAM, such as DDR3, for example, it is desirable to employ relatively weak pull-down transistors since, under the proposal, the pull-down transistor is essentially off, Of course, this is not the case for all DDR SRAMs. This is merely one more example of an alternative embodiment. In such a case, however, through calibration of the impedance of the transistors with binary codes, such as previously described, it is, therefore, possible to employ an embodiment of a bus termination scheme, such as previously described, in which the impedance is nonlinear and in which both the pull-up and pull-down transistors are on concurrently, while also providing relatively asymmetric impedances for the pull-up and pull-down transistors.

Although the claimed subject matter is not limited in scope to a particular method of operation, one particular embodiment of a method of operating a bus termination includes the following. Power may be applied to at least one pull-up and/or at least one pull-down transistor terminating the bus so that the transistors are on concurrently. Although the claimed subject matter is not limited in scope in this respect, the transistors may comprise FETs, such as MOS devices, for example. In this particular embodiment, applying power includes applying voltage so that, at least sometimes, at least one of the transistors is operating in the linear region of operation while at least one of the transistors is operating in the saturation region of operation during termination scheme operation. Likewise, for this particular embodiment, voltage is applied so that the at least one pull up transistor is operating in the saturation region of operation at the upper end of the voltage swing and in the linear region of operation at the lower end of the voltage swing for an oscillating pulse and vice-versa for the pull down transistor. Furthermore, as previously described, voltage is applied so that the at least one pull up and the at least one pull down transistors are operating in the saturation region of operation around the middle of the voltage swing for an oscillating pulse. In embodiments that employ multiple pull-up and pull-down transistors, selected transistors may be activated to at least approximate a desired impedance during termination scheme operation, as described previously.

It will, of course, also be understood that, although particular embodiments have just been described, the claimed subject matter is not limited in scope to a particular embodiment or implementation. For example, one embodiment may be in hardware, such as implemented on a device or combination of devices, as previously described, for example. Likewise, although the claimed subject mailer is not limited in scope in this respect, one embodiment may comprise one or more articles, such as a storage medium or storage media. These storage media, such as, one or more CD-ROMs and/or disks, for example, may have stored thereon instructions, that when executed by a system, such as a computer system, computing platform, or other system, for example, may result in an embodiment of a method of operating a termination scheme in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. An integrated circuit comprising:
   a bus termination scheme, said termination scheme including at least one pull-up and at least one pull-down transistor coupled to a pad; and
   wherein said transistors are coupled to be powered on concurrently during termination scheme operation so that said at least one pull up and said at least one pull down transistors are capable of operating in the saturation region of operation around the middle of a voltage swing for a signal delivered via the pad.

2. The integrated circuit of claim 1, wherein said transistors comprise field effect transistors (FETs).

3. The integrated circuit of claim 2, wherein said transistors are coupled so that, at least sometimes, at least one of said transistors is operating in the linear region of operation while at least one of said transistors is operating in the saturation region of operation during termination scheme operation.

4. The integrated circuit of claim 3, wherein said at least one pull up transistor is coupled so as to operate in the saturation region of operation at the upper end of the voltage swing and in the linear region of operation at the lower end of the voltage swing for an oscillating pulse.

5. The integrated circuit of claim 3, wherein said at least one pull down transistor is coupled so as to operate in the linear region of operation at the upper end of the voltage swing and in the saturation region of operation at the lower end of the voltage swing for an oscillating pulse.

6. The integrated circuit of claim 1, wherein said transistors are coupled to be powered on concurrently during termination scheme operation so that said at least one pull up and said at least one null down transistors are capable of operating in the saturation region of operation around the middle of a voltage swing for a signal delivered via the pad, the signal comprising an oscillating pulse.

7. The integrated circuit of claim 1, wherein said at least one pull up transistor comprises a plurality of pull up transistors and said at least one pull down transistor comprises a plurality of pull down transistors.

8. The integrated circuit of claim 7, wherein said plurality of pull up and pull down transistors are selectively activated to at least approximate a desired impedance during termination scheme operation.

9. The integrated circuit of claim 1, wherein said bus termination scheme comprises a receiving end of said bus.

10. A bus termination scheme comprising:
a set of transistors coupled to a pad and further coupled in a push-pull configuration so that during switching the impedance of said configuration is non-linear at least in part, and wherein said set of transistors are capable of operating in the saturation region of operation around the middle of a voltage swing for a signal delivered via the pad.

11. The bus termination scheme of claim 10, wherein said transistors comprise field effect transistors (FETs).

12. The bus termination scheme of claim 10, wherein said transistors are coupled so that, at least sometimes, at least one of said transistors is operating in the linear region of operation while at least one of said transistors is operating in the saturation region of operation during termination scheme operation.

13. The bus termination scheme of claim 10, wherein said bus termination scheme is implemented on an integrated circuit.

14. The bus termination scheme of claim 13, wherein said integrated circuit comprises a graphics processing unit (GPU).

15. The bus termination scheme of claim 14, wherein said GPU is incorporated in at least one of the following systems: a desktop computer, a mobile computer, a game console, a hand-held device, a wireless communications device, a networked device, a display system, a motherboard, and a graphics card.

16. The bus termination scheme of claim 10, wherein said bus termination scheme comprises a receiving end of said bus.

17. A bus termination scheme comprising:
means for switching coupled in a push-pull configuration and coupled to a pad such that an impedance of said means for switching is non-linear at least in part, wherein the sides of said push-pull configuration of said means for switching are capable of operating in the saturation region of operation around the middle of a voltage swing for a signal delivered via the pad.

18. The bus termination scheme of claim 17, wherein said means for switching comprises transistors.

19. The bus termination scheme of claim 18, wherein said transistors are coupled so that, at least sometimes, at least one of said transistors is operating in the linear region of operation while at least one of said transistors is operating in the saturation region of operation during termination scheme operation.

20. The bus termination scheme of claim 17, wherein said bus termination scheme is implemented on an integrated circuit.

21. The bus termination scheme of claim 20, wherein said integrated circuit comprises means for graphics processing.

22. The bus termination scheme of claim 21, wherein said means for graphics processing is incorporated in at least one of the following systems: a desktop computer, a mobile computer, a game console, a hand-held device, a wireless communications device, a networked device, a display system, a motherboard, and a graphics card.

23. The bus termination scheme of claim 17, wherein said bus termination scheme comprises a receiving end of said bus.

24. A method of operating a bus termination comprising:
applying power to at least one pull-up and at least one pull-down transistor coupled to a pad; and
terminating said bus so that said transistors are on concurrently, wherein said at least one pull Up and said at least one pull down transistors are capable of operating in the saturation region of operation around the middle of a voltage swing for a signal delivered via the pad.

25. The method of claim 24, wherein said transistors comprise field effect transistors (FETs).

26. The method of claim 24, wherein said applying power to said transistors comprises applying voltage so that, at least sometimes, at least one of said transistors is operating in the linear region of operation while at least one of said transistors is operating in the saturation region of operation during termination scheme operation.

27. The method of claim 26, wherein said applying power to said transistors comprises applying voltage so that said at least one pull up transistor is operating in the saturation region of operation at the upper end of the voltage swing and in the linear region of operation at the lower end of the voltage swing for the signal. the signal comprising an oscillating pulse.

28. The method of claim 27, wherein said applying power to said transistors comprises applying voltage so that said at least one pull down transistor is operating in the linear region of operation at the upper end of the voltage swing and in the saturation region of operation at the lower end of the voltage swing for said oscillating pulse.

29. The method of claim 24, wherein said transistors are coupled to be powered on concurrently during termination scheme operation so that said at least one null up and said at least one null down transistors are capable of operating in the saturation region of operation around the middle of a voltage swing for a signal delivered via the pad, the signal comprising an oscillating pulse.

30. The method of claim 24, wherein said at least one pull up transistor comprises a plurality of pull up transistors and said at least one pull down transistor comprises a plurality of pull down transistors, and further comprising:
selectively activating said plurality of pull up and pull down transistors to at least approximate a desired impedance during termination scheme operation.

31. An integrated circuit including a bus, said bus having been terminated by a method comprising:
applying power to at least one pull-up and at least one pull-down transistor coupled to and terminating said bus so that said transistors are on concurrently such that said at least one pull up and said at least one pull down transistors operate in the saturation region of operation around the middle of a voltage swing for a signal delivered via the bus.

32. The integrated circuit of claim 31, wherein said transistors comprise field effect transistors (FETs).

33. The integrated circuit of claim 31, wherein said method further comprises:

applying power to said transistors by applying voltage so that, at least sometimes, at least one of said transistors is operating in the linear region of operation while at least one of said transistors is operating in the saturation region of operation during termination scheme operation.

34. The integrated circuit of claim 31, wherein said transistors are coupled to be powered on concurrently during termination scheme operation so that said at least one pull up and said at least one pull down transistors are capable of operating in the saturation region of operation around the middle of a voltage swing for a signal delivered via the pad, the signal comprising an oscillating pulse.

35. The integrated circuit of claim 31, wherein said at least one pull up transistor comprises a plurality of pull up transistors and wherein said at least one pull down transistor comprises a plurality of pull down transistors, and wherein said method further comprises:

selectively activating said plurality of pull up and pull down transistors to at least approximate a desired impedance during termination scheme operation.

* * * * *

UNITED STATES PATENT AND TRADEMARK OFFICE
CERTIFICATE OF CORRECTION

PATENT NO. : 7,411,415 B2
APPLICATION NO. : 10/787923
DATED : August 12, 2008
INVENTOR(S) : Ashfaq R. Shaikh, Ting Ku and Huabo Chen It is certified that error appears in the above-identified patent and that said Letters Patent is hereby corrected as shown below:

In column 9, claim 6, line 12, the word "null" should be --pull--.

In column 10, claim 24, line 25, the word "Up" should be --up--.

In column 10, claim 29, line 52, the word "null" should be --pull--.

In column 10, claim 29, line 53, the word "null" should be --pull--.

Signed and Sealed this

Second Day of June, 2009

JOHN DOLL
*Acting Director of the United States Patent and Trademark Office*